United States Patent
Van Den Berg

(10) Patent No.: US 8,174,208 B2
(45) Date of Patent: May 8, 2012

(54) DRIVER FOR OPERATING A GAS DISCHARGE LAMP

(75) Inventor: John-John Pieter Jan Van Den Berg, Turnhout (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 420 days.

(21) Appl. No.: 12/447,692

(22) PCT Filed: Oct. 30, 2007

(86) PCT No.: PCT/IB2007/054400
§ 371 (c)(1),
(2), (4) Date: Apr. 29, 2009

(87) PCT Pub. No.: WO2008/053428
PCT Pub. Date: May 8, 2008

(65) Prior Publication Data
US 2010/0066262 A1    Mar. 18, 2010

(30) Foreign Application Priority Data

Nov. 3, 2006 (EP) ..................... 06123472
Apr. 12, 2007 (EP) ..................... 07106000

(51) Int. Cl.
*H05B 37/02* (2006.01)
(52) U.S. Cl. ......... 315/291; 315/224; 315/247; 315/308
(58) Field of Classification Search .................. 315/224, 315/246–247, 291, 307–308
See application file for complete search history.

(56) References Cited

U.S. PATENT DOCUMENTS

| | | | |
|---|---|---|---|
| 7,049,768 B1 * | 5/2006 | Zhu et al. ...................... | 315/307 |
| 2001/0038267 A1 | 11/2001 | Ono et al. | |
| 2004/0000880 A1 * | 1/2004 | Ozasa et al. .................. | 315/291 |
| 2004/0245945 A1 * | 12/2004 | Couwenberg et al. ........ | 315/307 |
| 2005/0134198 A1 * | 6/2005 | Crandall et al. .............. | 315/291 |
| 2005/0162098 A1 * | 7/2005 | Ball ............................. | 315/291 |
| 2005/0285535 A1 * | 12/2005 | Sugaya et al. ................ | 313/631 |
| 2006/0066261 A1 * | 3/2006 | Rahmane et al. ............. | 315/291 |
| 2006/0202641 A1 * | 9/2006 | Buij et al. ..................... | 315/308 |
| 2009/0009095 A1 * | 1/2009 | Pekarski et al. .............. | 315/174 |

FOREIGN PATENT DOCUMENTS

| WO | 9836622 A1 | 8/1998 |
|---|---|---|
| WO | 02091806 A1 | 11/2002 |
| WO | 2006051926 A1 | 11/2005 |
| WO | 2006016335 A1 | 2/2006 |

* cited by examiner

*Primary Examiner* — Jason M Crawford

(57) ABSTRACT

The present invention relates to a driver for driving a gas discharge lamp. In use, the tips of a conventional lamp's electrodes are subject to tip growth and tip destruction, resulting in decreased or increased arc length, respectively. This has an undesirable effect on the light output of the lamp. The driver of the present invention includes a controller for controlling a current source to the electrodes of the lamp whereby parameters of the current are varied in such a way that tip growth and tip destruction are alternated. As a result, arc length variations stay within certain limits over the lifetime of the lamp.

24 Claims, 4 Drawing Sheets

DRIVER FOR OPERATING A GAS DISCHARGE LAMP

FIELD OF THE INVENTION

The present invention relates in general to the field of gas discharge lamps, more particularly high-intensity discharge lamps (HID) or ultra-high pressure lamps (UHP). Specifically, the present invention relates to a driver for driving a HID lamp.

BACKGROUND OF THE INVENTION

Gas discharge lamps are commonly known, so an elaborate discussion of the design of a gas discharge lamp is not needed here. Suffice it to say that a gas discharge lamp comprises two electrodes located in a closed vessel filled with an ionizable gas or vapor. The vessel is typically quartz or a ceramic, for instance polycrystalline alumina (PCA). The electrodes are arranged at a certain distance from each other, and during operation an electric arc is maintained between those electrodes.

A gas discharge lamp may be powered by an electronic driver. Electronic drivers are commonly known, so an elaborate discussion of the design of electronic drivers is not needed here. The driver produces lamp current; although in principle direct current operation would be possible, the lamp current is typically a commutating current, i.e. a current with substantially constant magnitude but alternating direction; this is also indicated as square wave current. The commutation frequency may for instance be in the order of about 100 Hz.

One particular application for HID lamps is as light source in a projection system. In this field, there is a desire to make smaller panels (to reduce costs) and to increase the lamp power (to increase the light output). Further, it is desirable that the lamps have a long lifetime, and that the light output (lumen) of the lamp is substantially constant over the lifetime.

For smaller panels, the main parameter that influences the light output (lumen) of the lamp is the arc length, so the electrode distance needs to be as constant as possible over the lifetime. Further, the light output should be stable, thus the arc should be free from flatter, which puts requirements on the quality of the electrode surfaces.

SUMMARY OF THE INVENTION

One problem with gas discharge lamps is that during operation the shape of the electrode surface may change. Notably, a tip may grow on an electrode. The arc has the tendency of preferring to attach to the tip, thus a growing tip will reduce the arc length. On the other hand, it is also possible that an existing tip is being destroyed, thus increasing the arc length. Such changes in arc length directly influence the light output, which in undesirable.

The present invention is based on the insight that the tip formation (growth or destruction) depends on current parameters. Based on this insight, the present invention proposes to vary selected current parameters in such a way that tip growth and tip destruction are alternated, such that arc length variations stay within certain limits over the lifetime of the lamp.

WO-02/091806 discloses a method for driving a gas discharge lamp with commutating current where, for the purpose of increasing arc stability (reducing the number of arc jumps), the duty cycle of the current is modulated, the modulation having a modulation frequency and modulation amplitude. For variation of the light-arc, the modulation can be changed. This disclosure relates to short-term stability. The present invention aims to keep the lamp voltage constant over the life time of the lamp.

According to the present invention, a controller of the driver is capable of operating in a modulated duty cycle mode in which the duty cycle has a first value ($\Delta 1$) during a first phase (P1) alternated with a second value ($\Delta 2$) equal to one minus the first value ($\Delta 2 = 1 - \Delta 1$) during a second phase (P2), wherein the second phase and first phase have mutually equal duration, and wherein switching between the second phase and first phase and vice versa occurs at a predefined duty cycle switching frequency. Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
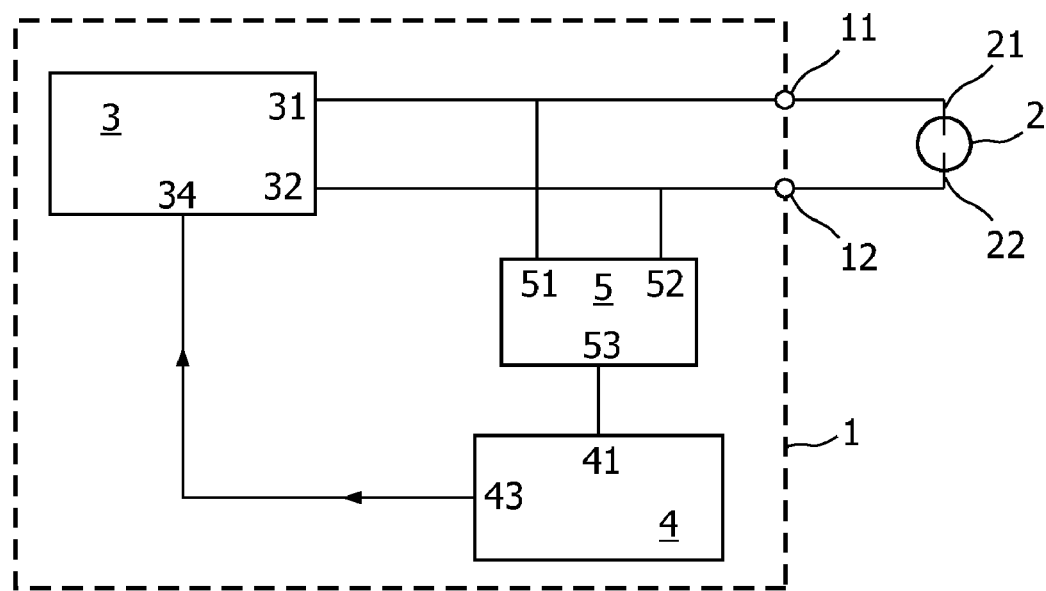
FIG. 1 schematically shows a block diagram of an electronic driver.

FIG. 1 schematically shows a block diagram of an electronic driver 1 for driving a gas discharge lamp 2. The driver 1 comprises a controllable current source 3, controlled by a controller 4. A gas discharge lamp 2 has opposing lamp electrodes 21, 22. The driver 1 has output terminals 11, 12 for connecting to the lamp electrodes 21, 22. The driver 1 further comprises measuring means 5 for measuring the distance between the lamp electrodes 21, 22. In a convenient embodiment, as shown, the measuring means 5 is implemented as a voltage sensor having input terminals 51, 52 coupled to the driver output terminals 11, 12, and an output terminal 53 coupled to an input 41 of the controller 4. The controller 4 has an output terminal 43 coupled to a control input 34 of the controllable current source 3. The controllable current source 3 has output terminals 31, 32 coupled to driver output terminals 11, 12. The controllable current source 3 is supplied from a suitable power source, for instance mains, but this is not illustrated for sake of simplicity.

Figure 2:
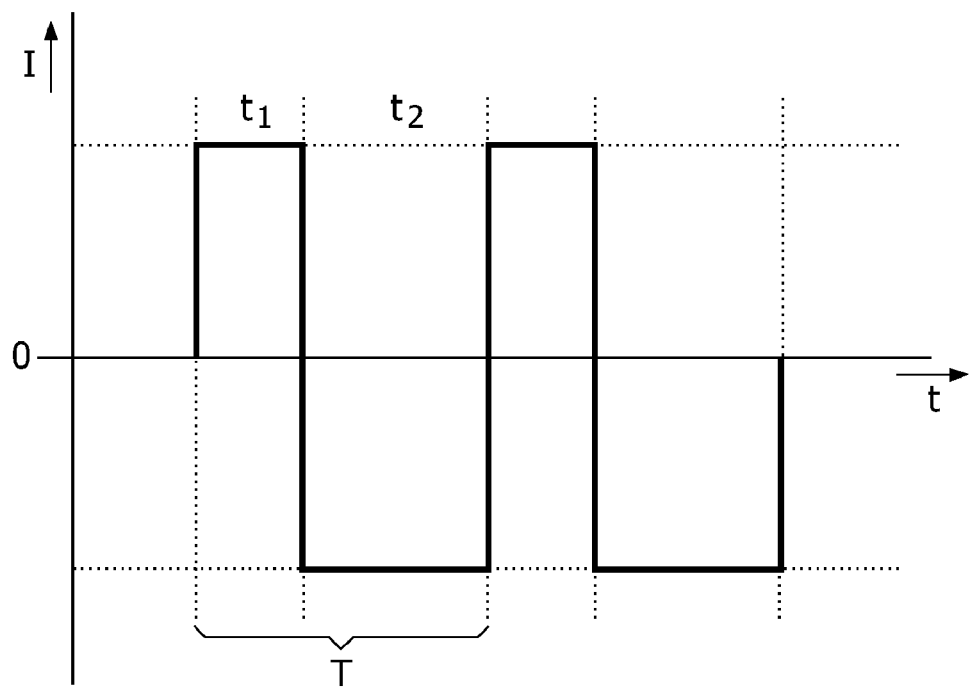
FIG. 2 is a graph schematically illustrating a waveform of a lamp current.

FIG. 2 is a graph schematically illustrating the waveform of the lamp current. The horizontal axis represents time t, the vertical axis represents current I. The lamp current is a commutating DC current, which means that the current magnitude is substantially constant at all times but the direction is regularly reversed. During a first time period t1, the current has a first direction (positive in the figure); during a second time period t2, the current has a second direction opposite to the first. A current period T is defined as $T = t1 + t2$. A duty cycle $\Delta$ is defined as $\Delta = t1/T$. A current frequency f is defined as $f = 1/T$.

Figure 3:
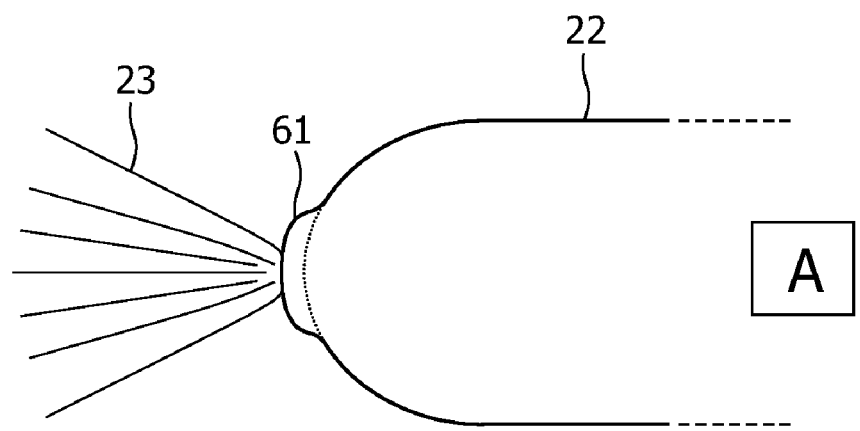
FIG. 3 schematically illustrates the shape of an electrode end on an enlarged scale.
Figure 3:
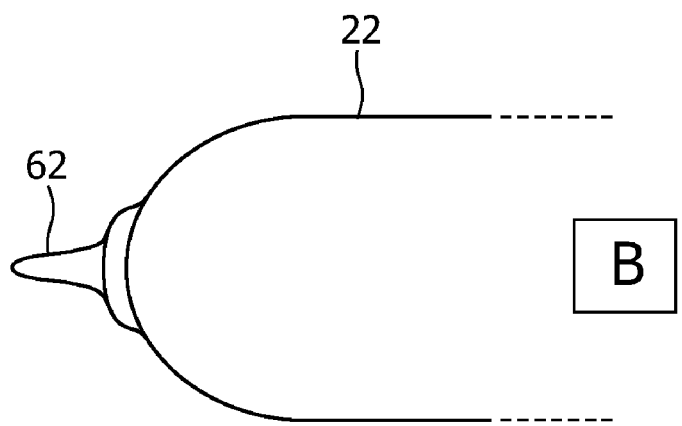
Figure 3:
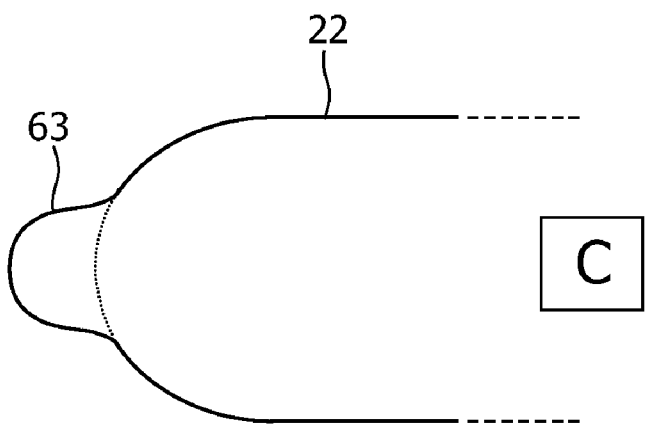

FIG. 3 schematically shows, on an enlarged scale, the end portion of a lamp electrode 22. The electrode 22 is shown as a cylindrical rod having a hemispherical end. During operation, a tip 61 is formed on the electrode end. At A, the figure shows that an arc 23 engages the tip 61 rather than the original electrode end. Depending on circumstances, the tip 61 may grow in the axial direction to form a long and narrow tip 62 (shown at B), or the tip may grow in the axial direction to form a relatively wide tip 63 (shown at C). It should be clear to a person skilled in the art that the growing tip effectively reduces the arc length and hence decreases the lamp voltage sensed by the sensor 5 and communicated to the controller 4.

WO-2006/016335 discloses that the tip formation depends on current frequency f. When the current frequency f is relatively low, in the range from 20 to 200 Hz, a relatively wide tip 63 will appear, whereas when the current frequency f is relatively high, in the range from 300 to 1000 Hz, a relatively narrow tip 62 will appear. The document discloses that a relatively wide tip has disadvantages, while also a relatively high current frequency has disadvantages. To solve this dilemma, the document discloses that a relatively high frequency is alternated with a relatively low frequency.

However, changing the current frequency may be undesirable. For instance, in the case of a lamp used in a display device, it is preferred that the current frequency has a fixed relation to the frame rate of the image device, so it is preferred that the current frequency is constant.

Therefore, the present invention aims to provide a method for driving a gas discharge lamp offering the same or similar advantages as WO-2006/016335 but where the current can be maintained constant.

Further, the present invention aims to provide a method for driving a gas discharge lamp capable of not only stimulating the growth of a wide tip or of a small tip, as desired, but also capable of destroying tips.

In a method according to the present invention, the controller 4 is capable of operating in three different modes.

Figure 4A:
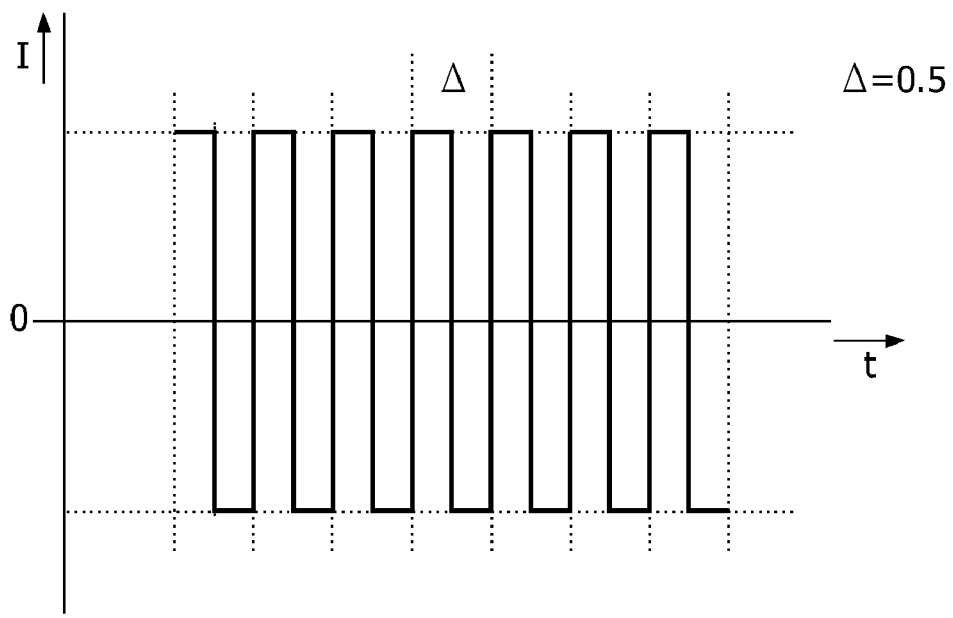
FIG. 4A is a graph illustrating a current waveform according to the present invention.

In a first operative mode, the controller 4 controls the current source 3 such that it provides a commutating DC current with a duty cycle $\Delta=0.5$ and a fixed commutation frequency f. FIG. 4A is a graph comparable to FIG. 2 illustrating the corresponding current waveform. The frequency f is selected such that the growth of a thin tip is stimulated in this mode. Thus, this frequency may be selected in the range from 300 to 1000 Hz. In a satisfying experimental set-up, the frequency was 360 Hz.

Figure 4B:
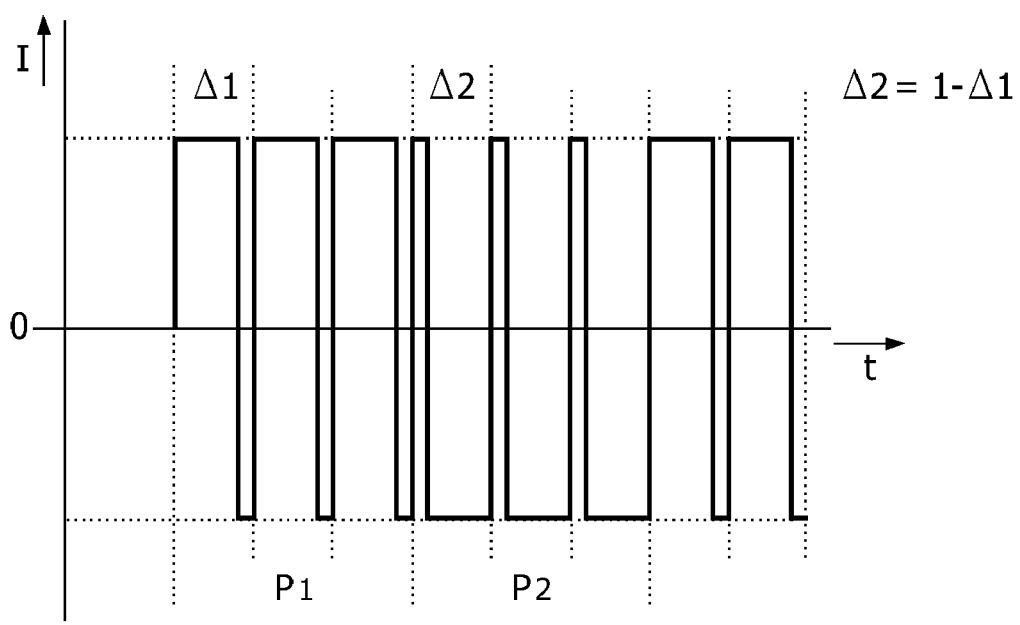
FIG. 4B is a graph illustrating a current waveform according to the present invention.

In a second operative mode, the controller 4 controls the current source 3 such that it provides a commutating DC current with a duty cycle $\Delta$ differing from 0.5 and the same fixed commutation frequency f as in the first operative mode. The duty cycle $\Delta$ is also modulated. During a first phase P1, the duty cycle $\Delta$ has a first fixed value $\Delta 1$. During a second phase P2, the duty cycle $\Delta$ has a second fixed value $\Delta 2=1-\Delta 1$. The first and second phase are alternated. The duration of the second phase P2 is equal to the duration of the first phase P1, so that on average the current has no preferred direction. Preferably, the duration of the first phase P1 and of the second phase P2 is an integer multiple of the current period T. FIG. 4B is a graph comparable to FIG. 4A illustrating the corresponding current waveform.

Alternating the duty cycle between $\Delta 1$ and $\Delta 2$ will be indicated as "duty cycle switching", which is done at a "duty cycle switching frequency $f_A$".

In this second operative mode, the duty cycle and the duty cycle switching frequency are selected such that the growth of a wide tip is stimulated in this mode. In said satisfying experimental set-up, the duty cycle was $\Delta 1=0.7$ and the duty cycle switching frequency was $f_A=60$ Hz.

In a third operative mode, the controller 4 controls the current source 3 in a similar way as in the second operative mode, but now the duty cycle and the duty cycle switching frequency are selected such that tips are destroyed. In said satisfying experimental set-up, the duty cycle was $\Delta 1=0.8$ and the duty cycle switching frequency was $f_A=20$ Hz.

It is noted that the actual form of the tip depends on said commutation parameters. In general, by increasing the duty cycle $\Delta 1$ or by increasing the duty cycle switching frequency, the tips are more easily destroyed. With lower duty cycle $\Delta 1$ or lower duty cycle switching frequency, the growth of wide tips is favored. Without duty cycle switching, the growth of narrow tips is favored.

In principle, there is some freedom in selecting the duty cycle switching frequency. In the case of image panels, it is preferred that the duty cycle switching frequency is synchronized with the panel frequency.

During operation, the controller 4 takes the following steps.

Assume that the controller 4 is operating in the first operative mode, i.e. $\Delta 1=0.5$. Thin tips are growing on the electrode ends, reducing the arc length, which causes the sensor input signal at sensor input 41 of the controller to decrease. The controller 4 compares this sensor signal with a first predetermined reference level. If the sensor signal reaches the predetermined reference level, the controller switches to the third operative mode, to destroy the tips. The arc length is growing again, and the sensor signal is increasing. The controller 4 compares this sensor signal with a second predetermined reference level higher than the first predetermined reference level. If the sensor signal reaches the second predetermined reference level, the controller switches back to the first operative mode.

Figure 5:
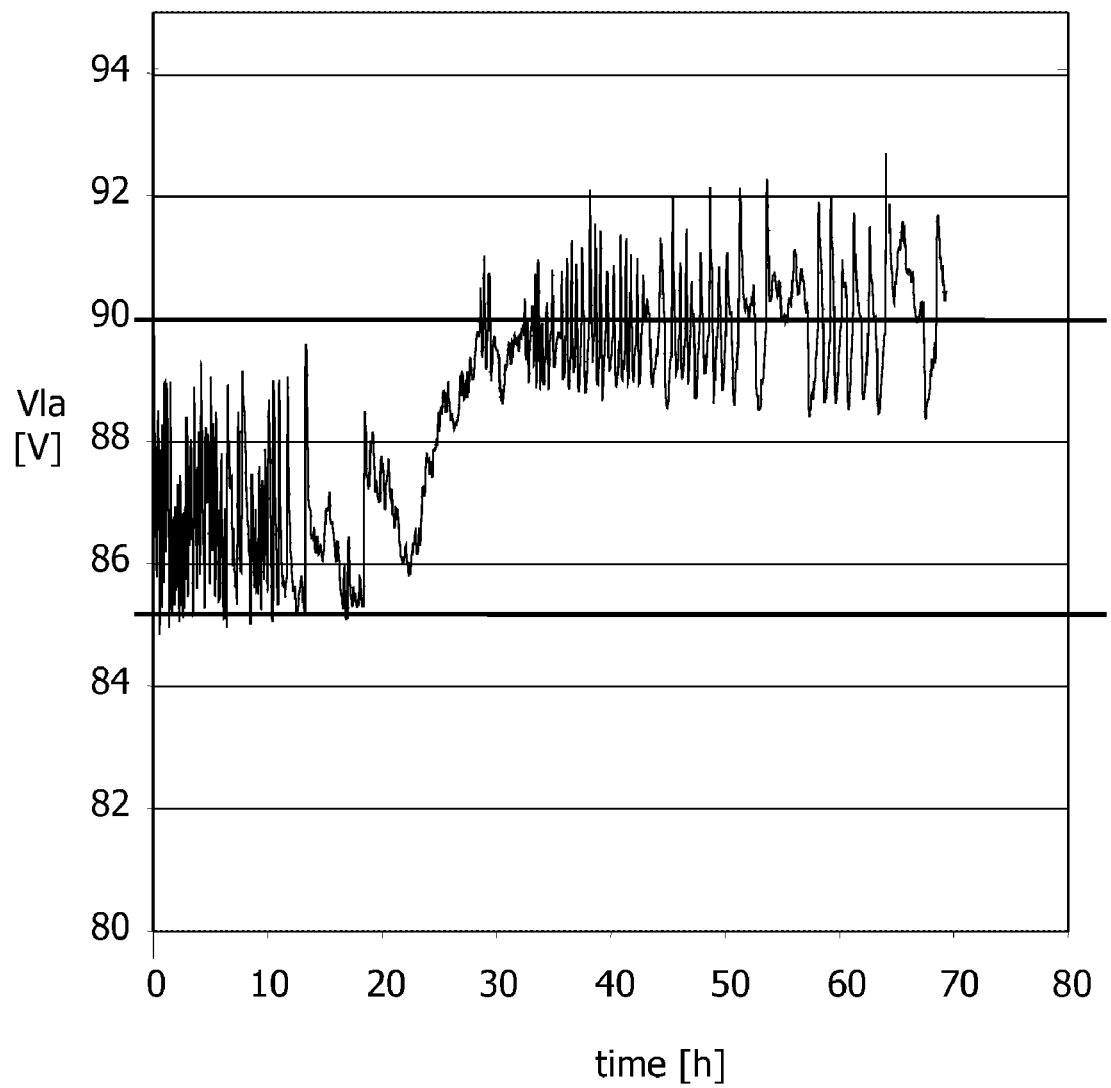
FIG. 5 is a graph showing lamp voltage (vertical axis) as a function of time (horizontal axis) in an experiment according to the present invention.

Thus, the tips alternatively grow and are destroyed. At the long term, the tips have an average length fluctuating around an average value. Likewise, the arc voltage has a value fluctuating around an average value. FIG. 5 is a graph showing the results of an experiment, showing lamp voltage (vertical axis) as a function of time (horizontal axis). In the left-hand portion of the graph, between time zero and about t=20 h, the above operation is executed. The graph shows that the lamp voltage is fluctuating between approximately 85 V and approximately 89 V.

The second predetermined reference level may be higher than the first predetermined reference level, but these two values may be close to each other or may even be equal: due to "inertia" of the lamp, i.e. a relatively slow response on the changing operative mode, the growth or destruction of a tip will continue for some time after changing the operative mode. In the example of FIG. 5, both the second and first predetermined reference levels were equal to somewhat more than 85 V, illustrated by a horizontal line.

Assume that the controller 4 is operating in the second operative mode. On the electrode ends, wide tips are growing in the axial direction, reducing the arc length, which causes the sensor input signal at sensor input 41 of the controller to decrease. The controller 4 compares this sensor signal with a third predetermined reference level. If the sensor signal reaches the third predetermined reference level, the controller may switch to the third operative mode, to destroy the tips, as described above. The arc length will increase, thus the sensor input signal at sensor input 41 of the controller will increase, and the controller may switch back to the second operative mode if the sensor signal reaches a fourth predetermined reference level. This operation is illustrated in the right-hand portion of the graph of FIG. 5, between about t=30 h and about t=70 h. The graph shows that the lamp voltage is fluctuating between approximately 88.5 V and approximately 92 V. Again, the fourth predetermined reference level may be equal to the third predetermined reference level, but in any case higher than the first and second predetermined reference levels. In the example of FIG. 5, both the third and fourth predetermined reference levels were equal to 90 V, illustrated by a horizontal line.

However, destroying the wide tips is relatively difficult. It is preferred that the controller first switches to the first operative mode, to make narrow tips, before switching to the third operative mode to destroy the tips.

Thus, by alternating operative modes, it is possible to manipulate the length of the tips and hence the arc voltage, which alternatively increases and decreases, in such a way that the arc voltage has a value fluctuating around an average value, so that, at the long term, on average, the arc voltage is constant.

Summarizing, the present invention provides a driver 1 which comprises a controllable current source 3 and a controller 4 for controlling the current source 3, and which further comprises measuring means 5 for measuring the distance between the lamp electrodes 21, 22, preferably a voltage sensor for sensing lamp voltage.

The controller controls the current source 3 such as to generate a commutating lamp current with a predefined current frequency f and a duty cycle $\Delta$. The controller is capable of operating in a modulated duty cycle mode in which the duty cycle has a first value $\Delta 1$ during a first phase P1 alternated with a second value $\Delta 2$ equal to one minus the first value $\Delta 2=1-\Delta 1$ during a second phase P2, wherein the second phase P2 and first phase P1 have mutually equal duration, and wherein switching between the second phase and first phase and vice versa occurs at a predefined duty cycle switching frequency $f_\Delta$.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, although it is preferred that the current frequency is maintained constant, this is not essential for implementing the invention. The importance in this respect is more that the present invention makes it is possible to keep the current frequency constant.

Further, in the above, examples are described where switching from one operative mode to another is done on the basis of the arc voltage reaching a certain level. This requires a voltage sensor, a reference level, and a comparator. It is also possible that the controller is designed to switch from one operative mode to another on the basis of a simple time measurement. The controller may be designed to operate in one mode, for instance the first operative mode, for a first fixed amount of time, then operate in the third operative mode for a second fixed amount of time, and then switch back to the first operative mode. This repeated switching of operative mode will result in de arc voltage fluctuating around a certain average value. The first and second fixed amounts of time may depend on, for instance, lamp type and arc current, and suitable values may be determined empirically, anywhere in the range from 1 sec to several hours.

Further, instead of switching from one operative mode to another on the basis of the arc voltage reaching a certain level, it is also possible to monitor the time-derivative of the arc voltage. It should be clear that the arc voltage corresponds to arc length and therefore corresponds to tip length, and that the time-derivative of the arc voltage corresponds to tip growth speed. It has been found that initially the tip growth speed is relatively high but that the tip growth speed reduces as the tip becomes longer. Thus, the tip growth speed can be seen as an indicator for tip length, which means that the time-derivative of the arc voltage can be seen as an indicator for tip length. Thus, it is for instance possible for the controller to operate in the first operative mode, to measure arc voltage, to calculate the time-derivative of the arc voltage based on subsequent voltage measurements, to compare the calculated time-derivative with a reference value, and to switch over to the third operative mode if the reducing time-derivative becomes equal to the reference value.

Combinations of decision parameters are also possible. For instance, it is possible that a tip is grown until reaching a certain arc voltage and that subsequently the system operates in the tip destruction mode for a certain time duration.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Driver for driving a gas discharge lamp having electrodes, each electrode having a tip, each respective tip subject to tip growth and tip destruction as a result of current supplied by the driver; the driver comprising:
   a controllable current source; and
   a controller for controlling the current source; wherein the controller (4) is configured to:
   (i) control the current source such as to generate a commutating lamp current with a predefined current frequency (f) and a duty cycle ($\Delta$) and
   (ii) operate in a modulated duty cycle mode in which the duty cycle has a first value ($\Delta 1$) during a first phase (P1) alternated with a second value ($\Delta 2$) equal to one minus the first value ($\Delta 2=1-\Delta 1$) during a second phase (P2), wherein the second phase (P2) and first phase (P1) have mutually equal duration, and wherein switching between the second phase (P2) and first phase (P1) and vice versa occurs at a predefined duty cycle switching frequency ($f\Delta$);

wherein in operation the controller varies current parameters in such a way that tip growth and tip destruction are alternated.

2. Driver according to claim 1, wherein the duration of the second phase (P2) and first phase (P1) is an integer multiple of the current period (T).

3. Driver for driving a gas discharge lamp having electrodes, the driver comprising:
   a controllable current source; and
   a controller for controlling the current source; wherein the controller (4) is configured to:
   (i) control the current source such as to generate a commutating lamp current with a predefined current frequency (f) and a duty cycle ($\Delta$) and
   (ii) operate in a modulated duty cycle mode in which the duty cycle has a first value ($\Delta 1$) during a first phase (P1) alternated with a second value ($\Delta 2$) equal to one minus the first value ($\Delta 2=1-\Delta 1$) during a second phase (P2), wherein the second phase (P2) and first phase (P1) have mutually equal duration, and wherein switching between the second phase (P2) and first phase (P1) and vice versa occurs at a predefined duty cycle switching frequency (f$\Delta$),
   wherein the controller is configured to operate in a wide tip growing mode in which the duty cycle values ($\Delta 1$, $\Delta 2$) and the duty cycle switching frequency (f$\Delta$) are selected such as to stimulate growth of wide tips on the end surfaces of the lamp electrodes.

4. Driver according to claim 3, wherein the current frequency is equal to 360 Hz, wherein the duty cycle is alternated between 0.7 and 0.3, and wherein the duty cycle switching frequency (f$\Delta$) is equal to 60 Hz.

5. Driver according to claim 3, wherein the controller is further configured to operate in a tip destruction mode in which the duty cycle values ($\Delta 1$, $\Delta 2$) and the duty cycle switching frequency (f$\Delta$) are selected such as to destroy tips on the end surfaces of the lamp electrodes, and wherein, in operation, the controller alternates between the wide tip growing mode and the tip destruction mode.

6. Driver according to claim 5, further comprising measuring means for measuring the distance between the lamp electrodes; wherein the controller, when operating in the wide tip growing mode, is operative to compare an output signal of the measuring means with a third predetermined reference level and, if the output signal of the measuring means reaches the third predetermined reference level, to switch over to operating in the tip destruction mode; and wherein the controller, when operating in the tip destruction mode, is operative to compare the output signal of the measuring means with a fourth predetermined reference level and, if the output signal of the measuring means reaches the fourth predetermined reference level, to switch over to operating in the wide tip growing mode.

7. Driver according to claim 6, wherein the third predetermined reference level is equal to the fourth predetermined reference level.

8. Driver according to claim 5, wherein the controller is configured for operating in the wide tip growing mode for a first time duration and then to switch over to operating in the tip destruction mode; and wherein the controller is configured for operating in the tip destruction mode for a second time duration and then to switch over to operating in the wide tip growing mode.

9. Driver according to claim 5, further comprising measuring means for measuring the distance between the lamp electrodes; wherein the controller, when operating in the wide tip growing mode, is operative to calculate a time derivative of an output signal of the measuring means, to compare the calculated time derivative with a predetermined reference value and, if said time derivative reaches the predetermined reference value, to switch over to operating in the tip destruction mode.

10. Driver for driving a gas discharge lamp having electrodes, the driver comprising:
    a controllable current source; and
    a controller for controlling the current source; wherein the controller (4) is configured to:
    (i) control the current source such as to generate a commutating lamp current with a predefined current frequency (f) and a duty cycle ($\Delta$) and
    (ii) operate in a modulated duty cycle mode in which the duty cycle has a first value ($\Delta 1$) during a first phase (P1) alternated with a second value ($\Delta 2$) equal to one minus the first value ($\Delta 2=1-\Delta 1$) during a second phase (P2), wherein the second phase (P2) and first phase (P1) have mutually equal duration, and wherein switching between the second phase (P2) and first phase (P1) and vice versa occurs at a predefined duty cycle switching frequency (f$\Delta$),
    wherein the controller is configured to operate in a tip destruction mode in which the duty cycle values ($\Delta 1$, $\Delta 2$) and the duty cycle switching frequency (f$\Delta$) are selected such as to destroy tips on the end surfaces of the lamp electrodes.

11. Driver according to claim 10, wherein the current frequency is equal to 360 Hz, wherein the duty cycle is alternated between 0.8 and 0.2, and wherein the duty cycle switching frequency (f$\Delta$) is equal to 20 Hz.

12. Driver for driving a gas discharge lamp having electrodes, the driver comprising:
    a controllable current source; and
    a controller for controlling the current source; wherein the controller (4) is configured to:
    (i) control the current source such as to generate a commutating lamp current with a predefined current frequency (f) and a duty cycle ($\Delta$) and
    (ii) operate in a modulated duty cycle mode in which the duty cycle has a first value ($\Delta 1$) during a first phase (P1) alternated with a second value ($\Delta 2$) equal to one minus the first value ($\Delta 2=1-\Delta 1$) during a second phase (P2), wherein the second phase (P2) and first phase (P1) have mutually equal duration, and wherein switching between the second phase (P2) and first phase (P1) and vice versa occurs at a predefined duty cycle switching frequency (f$\Delta$),
    wherein the controller is further configured to operate in a thin tip growing mode in which the duty cycle values ($\Delta 1$, $\Delta 2$) and the duty cycle switching frequency (f$\Delta$) are selected such as to stimulate growth of thin tips (62) on the end surfaces of the lamp electrodes.

13. Driver according to claim 12, wherein the current frequency is equal to 360 Hz, and wherein the duty cycle is constantly equal to 0.5.

14. Driver according to claim 12, wherein the controller is further configured to operate in a tip destruction mode in which the duty cycle values ($\Delta 1$, $\Delta 2$) and the duty cycle switching frequency (f$\Delta$) are selected such as to destroy tips on the end surfaces of the lamp electrodes, and wherein, in operation, the controller alternates between the thin tip growing mode and the tip destruction mode.

15. Driver according to claim 14, further comprising measuring means for measuring the distance between the lamp electrodes; wherein the controller, when operating in the thin tip growing mode, is operative to compare an output signal of the measuring means with a first predetermined reference level and, if the output signal of the measuring means reaches the first predetermined reference level, to switch over to operating in the tip destruction mode; and wherein the controller, when operating in the tip destruction mode, is operative to compare the output signal of the measuring means with a second predetermined reference level and, if the output signal of the measuring means reaches the second predetermined reference level, to switch over to operating in the thin tip growing mode.

16. Driver according to claim 15, wherein the second predetermined reference level is equal to the first predetermined reference level.

17. Driver according to claim 15, wherein the measuring means comprise a voltage sensor for measuring lamp voltage.

18. Driver according to claim 14, wherein the controller is configured for operating in the thin tip growing mode for a first time duration and then to switch over to operating in the tip destruction mode; and wherein the controller is configured for operating in the tip destruction mode for a second time duration and then to switch over to operating in the thin tip growing mode.

19. Driver according to claim 14, further comprising measuring means for measuring the distance between the lamp electrodes; wherein the controller, when operating in the thin tip growing mode, is operative to calculate a time derivative of an output signal of the measuring means, to compare the calculated time derivative with a predetermined reference value and, if said time derivative reaches the predetermined reference value, to switch over to operating in the tip destruction mode.

20. Driver according to claim 12, wherein, the controller is further configured to operate in a wide tip growing mode in which the duty cycle values ($\Delta 1$, $\Delta 2$) and the duty cycle switching frequency ($f\Delta$) are selected such as to stimulate growth of wide tips on the end surfaces of the lamp electrodes, and wherein in operation, the controller switches from the wide tip growing mode to the thin tip growing mode.

21. Driver according to claim 20, further comprising measuring means for measuring the distance between the lamp electrodes; wherein the controller, when operating in the wide tip growing mode, is operative to compare an output signal of the measuring means with a third predetermined reference level and, if the output signal of the measuring means reaches the third predetermined reference level, to switch over to operating in the thin tip growing mode; and wherein the controller, when operating in the thin tip growing mode, is operative to compare the output signal of the measuring means with a fourth predetermined reference level and, if the output signal of the measuring means reaches the fourth predetermined reference level, to switch over to operating in the wide tip growing mode.

22. Driver according to claim 21, wherein the fourth predetermined reference level is equal to the third predetermined reference level.

23. Driver according to claim 20, wherein the controller is configured for operating in the wide tip growing mode for a first time duration and then to switch over to operating in the thin tip growing mode; and wherein the controller is configured for operating in the thin tip growing mode for a second time duration and then to switch over to operating in the wide tip growing mode.

24. Driver according to claim 20, further comprising measuring means for measuring the distance between the lamp electrodes; wherein the controller, when operating in the wide tip growing mode, is operative to calculate a time derivative of an output signal of the measuring means, to compare the calculated time derivative with a predetermined reference value and, if said time derivative reaches the predetermined reference value, to switch over to operating in the thin tip growing mode.

* * * * *